United States Patent
Sachs et al.

(10) Patent No.: US 11,238,002 B1
(45) Date of Patent: Feb. 1, 2022

(54) ACCESSORY INTERFACE FOR A PORTABLE COMMUNICATION DEVICE

(71) Applicant: MOTOROLA SOLUTIONS, INC., Chicago, IL (US)

(72) Inventors: Daniel Grobe Sachs, Elmhurst, IL (US); Sheau Wei Ch'ng, Bayan Lepas (MY); Heng Leong Leong, Bukit Mertajam (MY); Xiang Rhung Ng, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/220,178

(22) Filed: Apr. 1, 2021

(51) Int. Cl.
| | |
|---|---|
| *G06F 3/00* | (2006.01) |
| *G06F 13/40* | (2006.01) |
| *G06F 13/42* | (2006.01) |

(52) U.S. Cl.
CPC ...... *G06F 13/4068* (2013.01); *G06F 13/4282* (2013.01); *G06F 2213/0042* (2013.01)

(58) Field of Classification Search
CPC .................................................. G06F 13/4086
See application file for complete search history.

(56) References Cited

U.S. PATENT DOCUMENTS

| | | | |
|---|---|---|---|
| 7,184,794 B2 * | 2/2007 | Hess ................... | H04M 1/6075 455/559 |
| 7,424,312 B2 | 9/2008 | Pinder et al. | |
| 7,526,317 B2 | 4/2009 | Pinder et al. | |
| 7,743,187 B2 | 6/2010 | Choi et al. | |
| 8,909,173 B2 * | 12/2014 | Harmke ............ | H04M 1/72409 455/90.2 |
| 9,268,728 B2 * | 2/2016 | Lai ........................ | G06F 13/385 |
| 10,554,237 B1 | 2/2020 | Lim et al. | |
| 2011/0060850 A1 * | 3/2011 | Ko ........................ | H04W 88/06 710/15 |

FOREIGN PATENT DOCUMENTS

| | | |
|---|---|---|
| CN | 101937414 B | 5/2013 |
| CN | 107613126 B | 3/2020 |

* cited by examiner

*Primary Examiner* — Henry Tsai
*Assistant Examiner* — Dean Phan

(57) ABSTRACT

An accessory interface (100) for an electronic accessory is provided. The accessory interface includes a microprocessor (102) that provides selectable data functionality. A configuration memory (106) is coupled to a connector (104) of the accessory interface via a unidirectional configuration interface (108). The unidirectional configuration interface indicates the selectable data functionality to a portable radio. The portable radio presents data connectivity signals to first and second GPIO pins of the connector which represent either valid or invalid data configuration states. The configuration state is presented to a single ended one (SE1) input port of the microprocessor. The microprocessor selects a data connectivity mode of operation in response to valid and invalid configurations being presented to the SE1 port. An accessory incorporating the accessory interface is able to interchangeably connect to different radios supporting different data connectivity modes of operation.

21 Claims, 4 Drawing Sheets

Dual Mode USB/UART Accessory Interface

Dual Mode USB/UART Accessory Interface

Dual Mode USB/UART Accessory Interface

Dual Mode USB/UART Accessory Interface

ACCESSORY INTERFACE FOR A PORTABLE COMMUNICATION DEVICE

FIELD OF THE DISCLOSURE

The present disclosure relates generally to an accessory for a portable communication device, and more particularly to an accessory interface for a portable communication device.

BACKGROUND

Portable battery-powered communication devices, such as portable radios, are advantageous in many environments, and particularly in public safety environments such as fire rescue, first responder, and mission-critical environments. Such devices are often used in conjunction with accessories that facilitate remote operation of one or more device features and/or additional features, such as remote speaker microphone (RSM) functionality. The accessory is typically coupled to the portable communication device via an accessory interface, such as a connector having plurality of interface pins/contacts. Cost and size constraints in portable products make limiting the number of pins/contacts important. Additionally, different portable radio products may utilize different data connectivity and/or a combination of data connectivity. There is strong desire to have a common accessory interface that would enable the same accessory to interchangeably operate with different radios, regardless of the different data connectivity. However, the different data connectivity presents challenges which may result in an accessory not being able to recognize or be supported by the portable radio device to which the accessory is attached.

Accordingly, there is a need for an improved accessory interface that can address the challenges associated the use of different radio connectivity.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
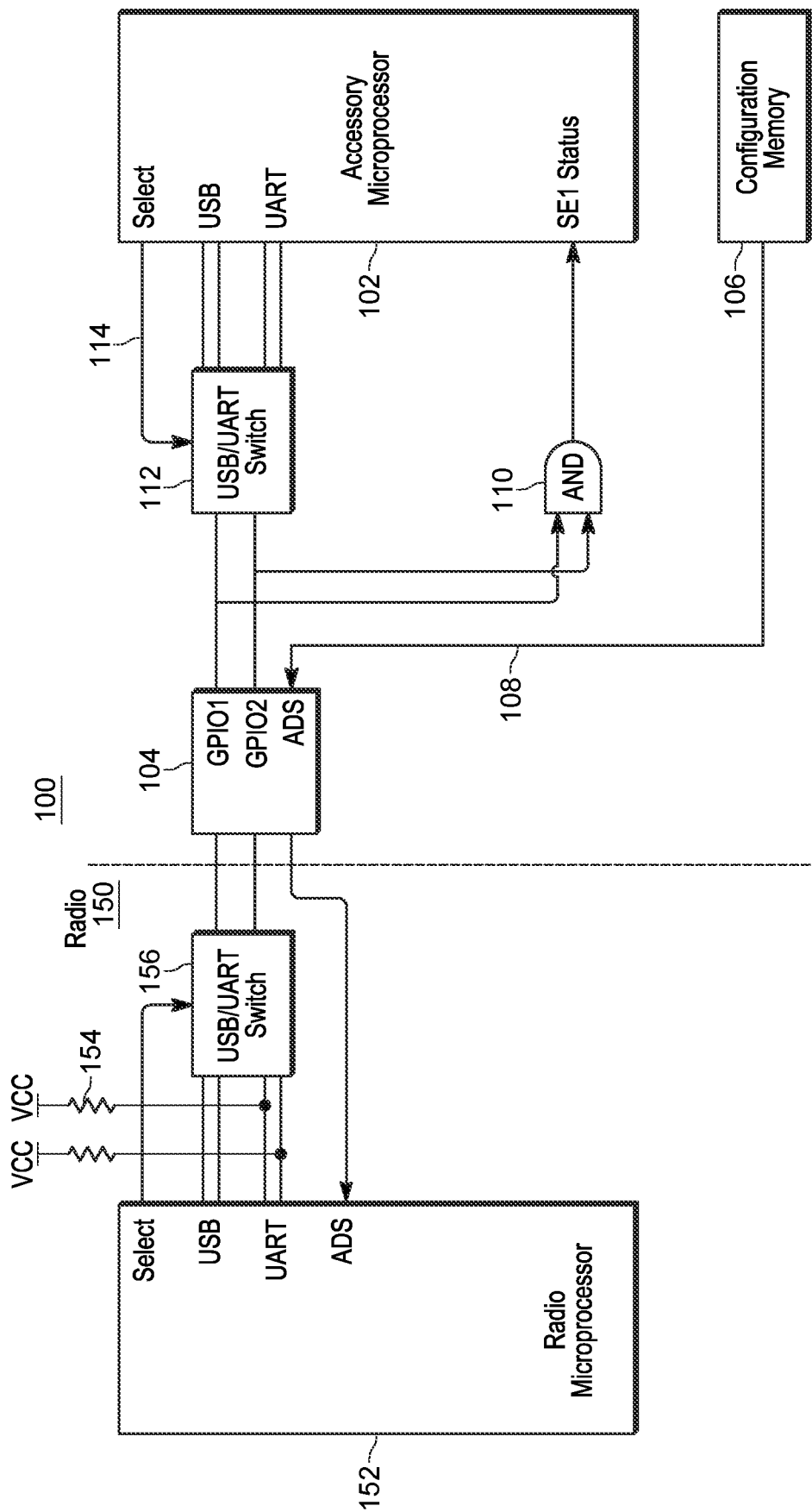
FIG. 1 is schematic block diagram of an accessory interface for a portable communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an accessory having an accessory interface that detects one or more different data connectivity types of a portable communication device to which the accessory is connected. The accessory is advantageously able to interchangeably interface to radios which support different data connectivity. The accessory interface provided herein comprises a configuration memory and a unidirectional configuration interface which provide an indicator from the accessory to the portable communication device indicating the accessory's available types of data connectivity. The radio then presents data connectivity signals to general purpose input output pins (GPIOs) of the accessory in accordance with the radio's connectivity type. For radios with more than one type of data connectivity (dual mode radios) a preferred data connectivity type is presented to the GPIO pins. The accessory may comprise a logic gate coupled to an input of a microprocessor indicating the presence of a single ended one (SE1) state on the communications GPIO pins to select the data connectivity type that was presented to the accessory. The logic configuration allows for the same SE1 input to be used regardless of data connectivity type. The SE1 input condition applied by the logic gate to the detector port of the microprocessor may be used to detect an illegal USB operation, which now, in accordance with the embodiments, is being used to indicate a valid UART operation. The microprocessor then enables a switch based on the selected data connectivity type. The switch multiplexes through the connectivity data signals to corresponding input pins of the microprocessor to enable accessory operation with the selected data connectivity type.

FIG. 1 is schematic block diagram of an accessory interface 100 formed and operating in accordance with some embodiments. The accessory interface 100 forms part of an electronic accessory for a portable communication device 150, sometimes referred to as a host device. The electronic accessory provides remote operation of one or more device features and/or additional features. For example, the electronic accessory may be a remote speaker microphone (RSM) accessory providing remote speaker microphone functionality for a battery operated portable radio, such as a portable two-way radio. For the purposes of this application, the embodiments will be described in terms of the accessory interface and other elements of the accessory (e.g. speaker, microphone) will not be described.

In accordance with the embodiments, the accessory interface 100 comprises a microprocessor 102 providing selectable data functionality, such as UART and USB (UART/USB) functionality, a connector 104, and a configuration memory 106 coupled to the connector via a unidirectional configuration interface 108. The connector 104 provides a plurality of accessory interface lines which accommodate attachment to, and detachment from the portable communication device 150, such as a battery operated portable two-way radio.

The configuration memory 106 preferably comprises a single-wire serial memory device. For example, the memory may be a single-wire EEPROM such as a DS2433 or DS24B33 1-Wire™ memory device from Maxim Integrated Products, or an A1007 single-wire authenticator and memory device from NXP Semiconductors. The unidirectional configuration interface 108 may be implemented using, for example, an accessory detection standard (ADS) line to couple the configuration memory 106 to the connector 104. The interface beneficially provides a physical and software interface to transfer a data configuration, in this case the selectable UART/USB configurability of the accessory to the radio. Using a unidirectional (one-way) configuration interface beneficially avoids configuration cues being written back to the configuration memory 106. An interface, such as a Global Core Accessory Interface (GCAI) can be used for example, to interface to a portable communication device, and when such an interface is used, the connector 104 may also be referred to as a GCAI connector. Other non-GCAI interfaces having a unidirectional configuration interface can also be used. For example, the proposed technique could be used to select the communications physical layer interface used on a standard USB micro-B connector.

In accordance with some embodiments, the unidirectional configuration interface 108 indicates the selectable UART/USB functionality to an accessory detection pin of the connector 104. The accessory interface 100 further comprises a logic gate 110 coupled to the connector 104, the logic gate receiving voltage inputs upon attachment of a portable communication device to the accessory interface, the voltage inputs being indicative of the portable communication device's preferred data connectivity type. In accordance with the embodiments, the logic gate 110 generates a logic gate output to present to a single ended one (SE1) input port of the microprocessor 102. The microprocessor, in response to the single ended one input, selects the mode of operation comprising either a UART mode of operation or a USB mode of operation. While logic gate 110 is shown as a discrete logic 'AND' gate presenting a logic input to a dedicated port on the microcontroller, other configurations could be used to detect the single ended one input condition on the shared UART and USB lines and select either a UART mode of operation or a USB mode of operation. Configurations using two logic inputs to the microcontroller and a logic gate implemented in software, for example, could be used. Hence, using the AND gate approach beneficially uses only one pin on the accessory microprocessor (saving pin count), but if pin count is not a concern, the detection can be achieved using both GPIO1 and GPIO2 feeding directly to the accessory microprocessor (using two pins of the accessory microprocessor) and allowing the microprocessor to detect and make the selection based on the input's state.

In accordance with some embodiments, the microprocessor 102 selects the UART mode of operation in response to an invalid USB configuration (SE1 logic state) being presented to the SE1 input of the microprocessor within a predetermined detection timeframe. For example, a UART mode of operation is selected in response to an invalid USB signal being presented to the logic gate 110 and reflected in the SE1 input of the microprocessor within the predetermined detection timeframe. Alternatively, the microprocessor 102 selects a USB mode of operation in response to a logic low signal presented to the SE1 input of the microprocessor, indicating that a valid USB configuration is present on the shared USB and UART signal wires, for the entire predetermined detection timeframe and expiration of that timeframe. For example, a USB mode of operation is selected in response to a valid USB signal configuration being presented to the logic gate 110 and reflected in the SE1 input of the microprocessor for the predetermined detection timeframe, and the predetermined detection timeframe expires.

The unidirectional configuration interface 108 of the configuration memory 106 advantageously provides a one-way interface to the connector 104 (and thus to the attached portable communication device) to indicate selectable UART/USB functionality of the accessory without requiring any communication back from the portable communication device to the configuration memory. The use of a unidirectional configuration interface beneficially avoids any ambiguity which might otherwise occur if configuration cues were required to be written back to the configuration memory 106. The portable communication device is able to simply present its preferred mode of operation as data connectivity signals to the accessory's GPIO ports (GPIO1, GPIO2) which in turn triggers the accessory to select the indicated mode of operation.

The data signals indicative of the desired mode of operation are presented to GPIO data lines of connector 104 and applied as inputs to the logic gate 110. The logic gate 110 generates a logic gate output to present to the single ended one (SE1) input port of the microprocessor 102. The single ended one input (SE1) to the microprocessor 102 determines the selection of a UART mode of operation for an invalid USB logic state or a USB mode of operation in response to a valid USB logic state.

The preference for UART over USB is a decision made as part of the radio architecture, for example for power saving reasons. Radio microprocessor 152, pull-up resistors 154 and a switch 156 control the presentation of signals to the accessory connector 104. For example, UART data signals (Tx, Rx) are presented to first and second data interface pins (GPIO1, GPIO 2) when the portable communication device attached to the electronic accessory has both USB and UART functionality; UART data signals (Tx, Rx) are presented to first and second data interface pins (GPIO1, GPIO 2) when the portable communication device attached to the electronic accessory has only UART functionality; and USB data signals (D+,D−) are presented to first and second data interface pins of the connector (GPIO1, GPIO 2) when the portable communication device attached to the electronic accessory has only USB functionality. The first and second data interface pins (GPIO1, GPIO 2) thus operate as a data pipe to the accessory interface 100.

Predetermined time delays are applied by the accessory interface 100 to ensure that the radio's preferred mode of operation is applied to the accessory connector's GPIO lines (GPIO1, GPIO2). The accessory decodes the GPIO lines which are shared for UART and USB. Hence, D+/D− supply signals are presented to the GPIO lines to indicate preferred USB operation and Ts, Rx data signal signals are presented for UART operation. When USB is selected, the radio USB host provides a pull-down on both D+ and D−, ensuring a Single Ended 0 is present on these wires and ensuring that the single ended one (SE1) input of the microprocessor detects a non-SE1 state. When UART is selected, pull-up resistors 154 in the radio 150 ensure that both UART-Tx and UART-Rx lines default to a high (Single Ended 1) state and ensure that the single ended one (SE1) input to the microprocessor detects the presence of an invalid USB state. The accessory does not enable its USB port and present a pull-up resistor for USB identification (the pull-up resistor being internal within the accessory microprocessor) until it determines the host is presenting a valid USB state. Hence, the accessory is not detected by the USB host until the internal pull-up of the microprocessor gets switched on. Likewise, the transmitter for the UART in the accessory does not turn on until the accessory determines that the host is presenting an invalid USB state. This approach advantageously eliminates the possibility of conflicts between the USB port drivers in the radio and the UART port driver in the accessory, and vice versa.

To enable the selected mode of operation, the accessory interface 100 further comprises a switch 112 for receiving a selection signal 114 from the microprocessor 102 indicative of the selected mode of operation. The switch 112 is preferably a high performance analog multiplexor (MUX) switch. The switch 112 multiplexes the data signals associated with the selected mode of operation from the connector 104 to corresponding input pins of the microprocessor 102, thereby enabling the selected UART mode of operation or the selected USB mode of operation. For the UART mode of operation, the switch 112 is multiplexed to apply Tx, Rx data signals from the portable communication device 150 to the corresponding UART input pins of the microprocessor to enable the selected UART mode of operation. For the USB mode of operation, the switch 112 is multiplexed to apply D+, D−, data signals from the portable communication device 150 to corresponding USB input pins of the microprocessor to enable the selected USB mode of operation.

Table 1 summarizes the operation of the accessory interface 100 based on different radio types being attached thereto, in accordance with some embodiments.

TABLE 1

| RADIO TYPE - connected to accessory | GPIO 1 | GPIO 2 | Logic Gate Output to SE1 Status input of microprocessor | SELECT (output from processor) | SWITCH OUTPUT TO PROCESSOR |
|---|---|---|---|---|---|
| USB only | D+ | D− | 0 | USB | D+ D− |
| UART only | Tx | Rx | 1 | UART | Tx Rx |
| UART/ USB | Tx | Rx | 1 | UART | Tx Rx |

Accessory interface 100 allows an electronic accessory to advantageously interchangeably accommodate a plurality of different portable communication devices having different data connectivity. For example, accessory interface 100 embodied within an RSM accessory can interchangeably accommodate a portable radio having a USB-only data transport, a radio having a UART-only data transport, and a dual mode radio having both UART/USB data transports. A dual mode radio having both UART/USB data transports may utilize one type of data transport for low power radio applications, and a different type of data transport for high data transfer applications.

Table 2 is provided to describe the USB physical (USB PHY) layer signaling.

| Signal | Line transition | SE1 input at microp | Description | USB 1.X Low Speed (pull-up on D−) | | USB 1.X Full Speed (pull-up on D+) | |
|---|---|---|---|---|---|---|---|
| | | | | D+ | D− | D+ | D− |
| J | idle | Low | Present during transmission line transition (or waiting for a new packet) | low | high | high | low |
| K | Inverse of J State | Low | Present during transmission line transition (or waiting for a new packet) | high | low | low | high |
| SE0 | Single-Ended Zero | Low | Both D+ and D− are low. May indicate end of packet signal for USB device or a detached device | low | low | low | low |
| SE1 | Single-Ended One | High (Assert) | Invalid state for USB | high | high | high | high |

The signals denoted in the far left column of Table 2 (J, K, SE0, SE1) represent signals occurring on the GPIO1, GPIO2 pins of FIG. 1, where D+ refers to GPIO1 and D− refers to GPIO2. As shown in Table 2, the J signal in full speed applications results in D+=HIGH, and D−=Low, the K signal is the inverse state of J, the SE0 signal results in both D+ and D−=Low, and the SE1 signal results in both D+ and D−=High. Until the accessory switches to USB mode, the accessory will detect SE0. As further seen in Table 2 the SE1 input to the microprocessor 102 determines the selection of one of:

a UART mode of operation in response to an invalid USB configuration (high, corresponding to an SE1 logic state) being presented to the SE1 input to the microprocessor within the predetermined time frame; and a USB mode of operation in response to a valid USB configuration (Low, corresponding to an SE0 or J/K logic state) being presented to the SE1 input to the microprocessor during a predetermined detection timeframe and the timeframe expires.

The signaling of Table 2 is based only on the USB physical (PHY) layer of an Open Systems interconnection model (OSI model). The OSI model's transport layer (XNL) and application layer (XCMP) are not impacted. Full speed operation is triggered by the accessory selecting to apply a pull-up resistor to the D+ line when the USB physical layer is enabled. Low speed operation is triggered by the accessory selecting to apply the internal pull-up resistor to the D− line when the USB physical layer is enabled. After this selection is made, the radio initiates communication with the accessory over the D+ and D− pins using the selected USB operating speed.

Hence, an electronic accessory incorporating the accessory interface 100 can advantageously take advantage of an invalid USB logic configuration (SE1) being indicated to the accessory microcontroller by its SE1 input to enable UART operation. In response to detecting a UART portable radio device being connected to the accessory, switch 112 is multiplexed to apply UART data signals (Tx, Rx) to UART inputs of the microprocessor 102 to enable the UART mode of operation.

Figure 2A:
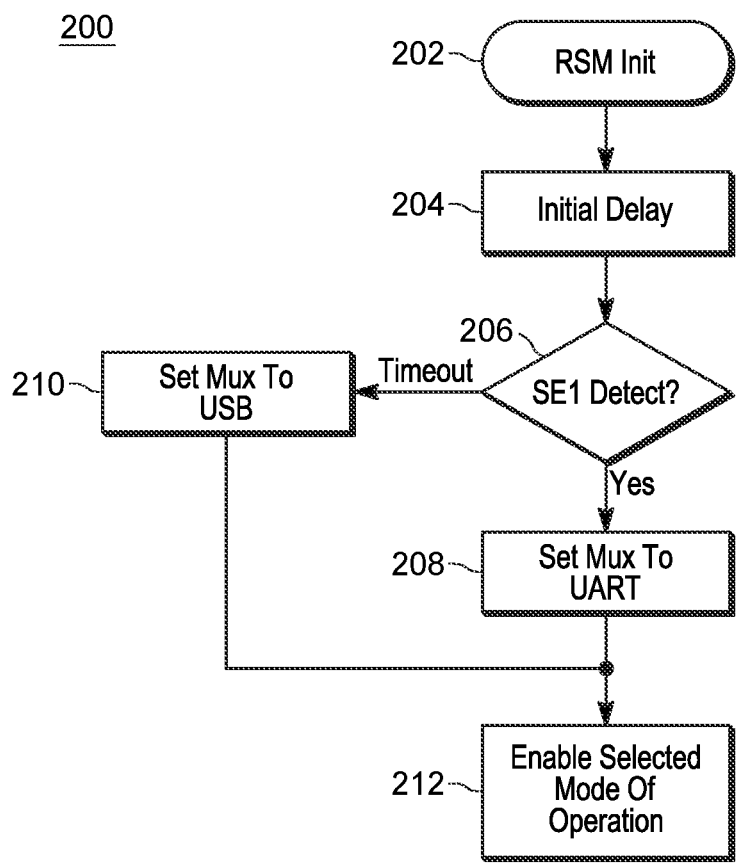
FIG. 2A is a flowchart of a method for operating an accessory interface (from the accessory perspective) in accordance with some embodiments.

FIG. 2A is a flowchart for a method 200 of interfacing an electronic accessory having the accessory interface 100 of FIG. 1 to a portable radio (viewed from the accessory perspective) in accordance with some embodiments. Beginning at 202, the electronic accessory, such as a remote speaker microphone (RSM), is attached to the portable radio and turned on. An initial delay takes place at 204 during which time the accessory provides an indicator to the radio from the configuration memory 106 via the unidirectional configuration interface 108 that the accessory provides selectable UART/USB functionality.

After the initial predetermined delay for synchronization at 204, a status input (single ended one) port of the microprocessor 102 is read at 206. If a status input of a logic level high (SE1) is presented to the microprocessor at 206, then the accessory microprocessor selects a UART mode of operation, and sets the MUX switch 112 to UART at 208. The single ended one input (SE1) status is a logic level high (SE1) when either a UART-only radio device has been connected to the accessory or a dual mode radio device (UART/USB) preferring UART operation has been connected to the accessory. The accessory uses the fact that the single ended one configuration of the USB D+ and D− pins is not a valid USB configuration, and therefore is only present when the radio does not enable its USB interface, and therefore the accessory selects the UART mode of operation when SE1 signaling is presented on the shared GPIO pins.

For the UART mode of operation, the switch 112 is multiplexed at 208 to apply UART data signals (Tx, Rx) to UART enablement inputs of the microprocessor 102. The microprocessor then enables, at 212, the selected UART mode of operation. The enablement within the microprocessor is achieved by connecting the selected protocol physical layer to the transport and application layer.

Back at 206, after a predetermined detection timeframe, if no logic level high is presented to the single-ended one (SE1) status input of the microprocessor, then the microprocessor will select a USB mode of operation by setting the switch 112 to USB at 210. Hence, if no SE1 is presented to the microprocessor within the predetermined detection time frame (set at 206), then USB operation is enabled at 212.

The selection of the USB mode of operation occurs when a USB-only or a UART/USB capable portable radio preferring USB is connected to the accessory and presents a valid USB logic configuration (SE0, J, or K state) to the SE1 logic gate (the AND gate 110 of FIG. 1), resulting in a low (0) signal to the SE1 status input of the accessory microprocessor for the predetermined time. Conversely, dual mode radios (UART/USB) preferring UART and UART-only radios will present invalid USB logic to the SE1 gate (the AND gate 110 of FIG. 1), resulting in a high (1) signal on the SE1 input to the accessory microprocessor during this window.

Figure 2B:
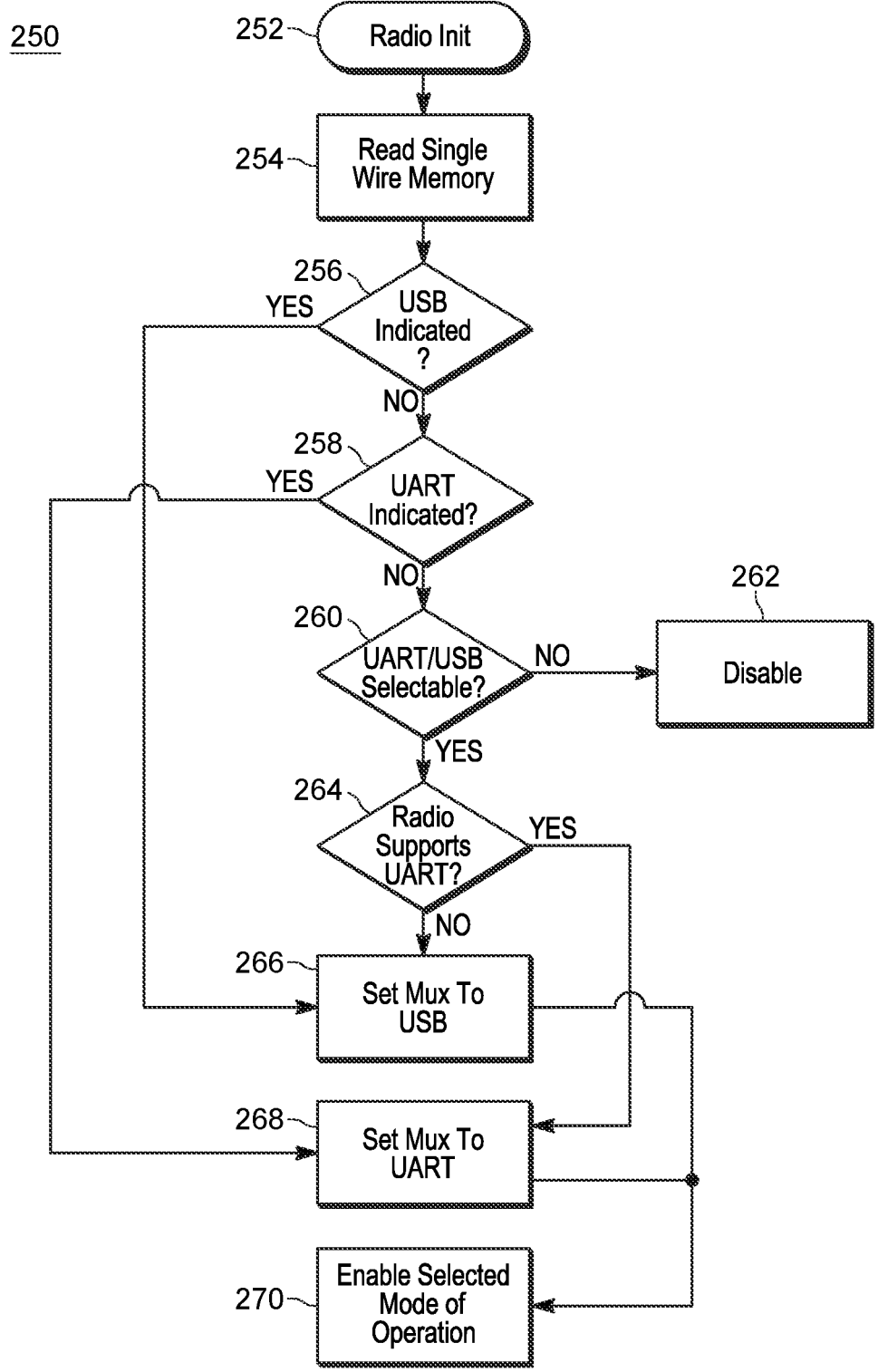
FIG. 2B is a flowchart of a method for a portable radio to interoperate with the accessory interface (from a host device perspective) in accordance with some embodiments.

FIG. 2B is a flowchart for a method 250 of interfacing a portable communication device 150, which will be referred to as a portable radio, to an accessory having the accessory interface 100 of FIG. 1 (viewed from the host/radio perspective) in accordance with some embodiments.

Beginning at 252, the portable radio is attached to and initializes with the accessory. The portable radio then reads the unidirectional configuration interface 108 originating from the accessory's configuration memory 106.

If the accessory's configuration memory 106 has indicated to the radio that the accessory supports only USB, then the radio presents USB data signals (D+, D−) to the inputs of the MUX switch 112 of the accessory at 266. The accessory will then enable the selected mode of operation, in this case a USB mode of operation, at 270 in the manner previously described in FIG. 2A.

If the accessory's configuration memory 106 has indicated to the radio that the accessory supports only UART at 258, then the radio presents UART data signals (Tx, Rx) to the inputs of the MUX switch 112 of the accessory at 268. The accessory will then enable the selected mode of operation, in this case a UART mode of operation, at 270 in the manner previously described.

If USB-only and UART-only have not been indicated to the radio at 256, 258, the accessory's configuration memory may indicate to the radio that the accessory supports selectable UART/USB operation at 260. If the accessory does not provide for USB-only, UART-only or selectable UART/USB, then the accessory data interface is disabled at 262.

If the accessory's configuration memory 106 has indicated to the radio that the accessory supports selectable UART/USB at 260, then the radio checks that the radio supports UART operation at 264.

If the radio does not support UART operation at 264, then the radio proceeds to present USB data signals (D+, D−) to the inputs of the MUX switch 112 of the accessory at 266. The accessory will then enable a USB mode of operation at 266, in the manner previously described manner previously described in FIG. 2A.

If the radio does support UART operation at 264, then the radio proceeds to present UART data signals (Tx, Rx) to the inputs of the MUX switch 112 of the accessory at 268. The accessory will enable a UART mode of operation at 270, in the manner previously described.

For dual mode radios that support both UART and USB, the automatic selection of UART operation provides power saving operational benefits over USB. The methods 200 and 252 advantageously only look at a top physical layer and media access layer of an Open Systems Interconnection (OSI) model. The transport layer (XNL) and application layer (XCMP) of the OSI are not impacted.

Accordingly, by adding selectable UART/USB to the unidirectional memory interface, the accessory is able to provide for UART, USB, and selectable UART/USB mode of operation. Hence, a USB-only radio can operate with the accessory using the USB protocol. A UART-only radio can operate with the accessory using a UART protocol. A radio that is operational with both UART and USB can operate with the accessory by selecting a preferred protocol, which in this case is the UART protocol. In some embodiments, the UART protocol is considered the preferred protocol for dual mode radios for power saving reasons. It is possible, however, to reconfigure the accessory to select the USB protocol in a dual mode radio, if this were so desired (by altering the priority logic).

Figure 3:
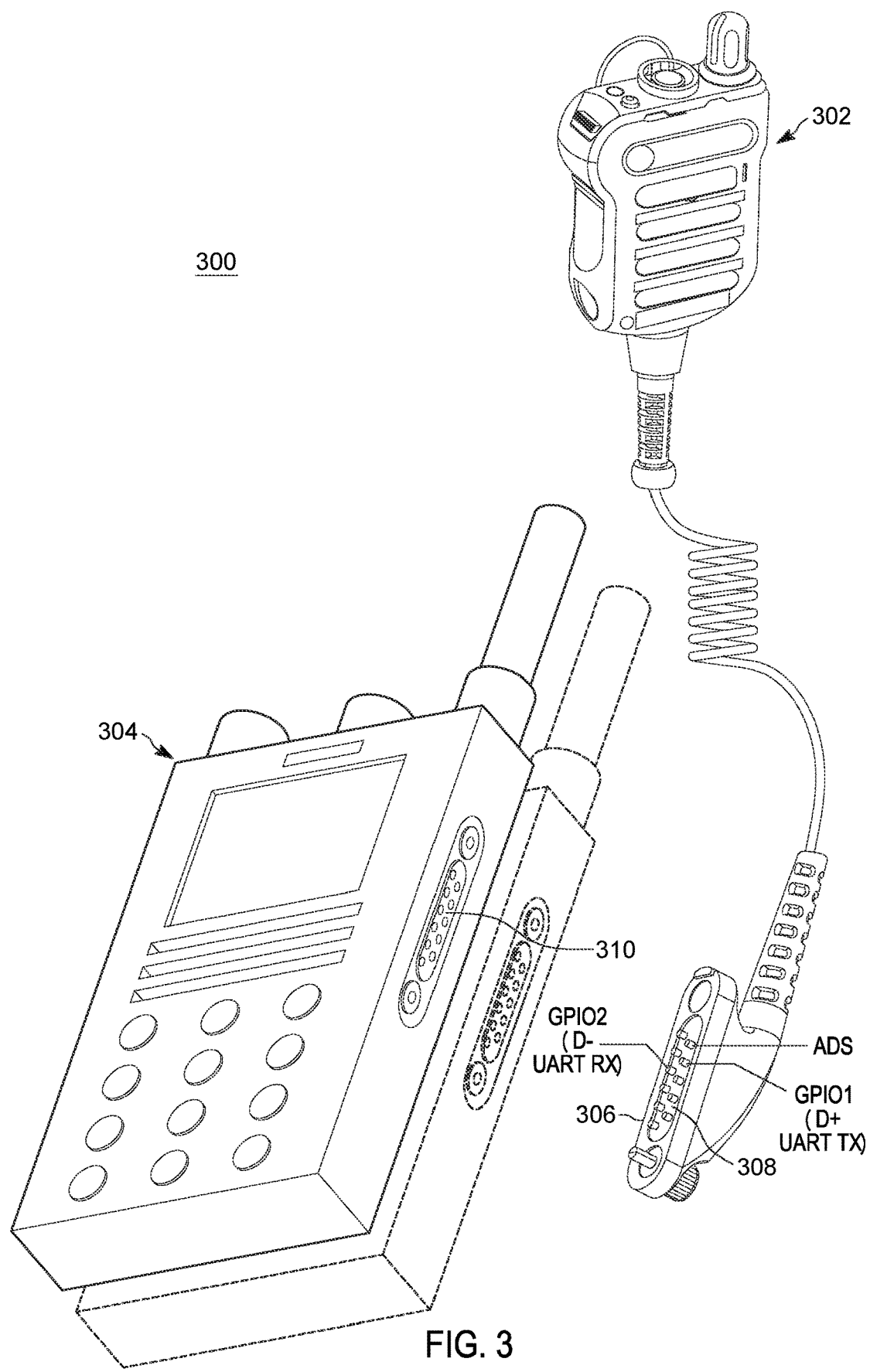
FIG. 3 is a portable communication system comprising an accessory having the accessory interface of FIG. 1 and a communication device, the system being formed and operating in accordance with some embodiments.

FIG. 3 is a portable communication system 300 comprising an accessory 302 having an accessory interface for a portable communication device 304 formed and operating in accordance with some embodiments. The accessory 302, depicted as an RSM, comprises the accessory interface 100 of FIG. 1, along remote speaker and microphone audio functionality. The accessory 302 comprises an accessory connector 306 having accessory connector pins. The accessory connector pins 308 may be metal pin contacts or other suitable contact for mating with corresponding device contacts 310. The accessory connector pins 308 may be, for example, pogo pins, or other suitable pin or contact for mating with the corresponding device contacts 310. The accessory connector 306 may comprise a screw type mount, snap fit mount, or other interconnect means for coupling to portable communication device 304. While the accessory 302 is depicted as a remote speaker microphone (RSM), it is appreciated that other cabled or other direct contact-to-contact type accessories may interconnect to the portable communication device 304. The embodiments enable fewer interconnects allowing for a smaller connector with fewer pins, particularly advantageous to wearable accessories for portable communication devices utilized in public safety environments.

As seen in FIG. 3, the accessory connector pins 308 comprise an accessory detection standard (ADS) pin (the pin assigned to the unidirectional configuration interface 108 of FIG. 1) and first and second GPIO pins (GPIO1, GPIO2). Other contacts, such as supply, GND, microphone, and speaker have not been shown but are understood to be present for accessory (e.g. RSM) functionality.

In accordance with some embodiments, the accessory 302 of the communication system 300 may interchangeably couple to a plurality of portable communication devices, such as portable communication device 304, having different data connectivity types. The plurality of portable communication devices is represented by dashed lines, and can include additional devices. The connector 306 provides interchangeable attachment of the accessory to each of the plurality of portable communication devices, regardless of the data connectivity type.

The accessory 302 includes a microprocessor, such as the microprocessor 102 shown in FIG. 1 that supports selectable data connectivity via a single ended one (SE1) input of the microprocessors. The accessory 302 comprises a configuration memory, such as configuration memory 106 shown in FIG. 1, operatively coupled to the ADS pin via a unidirectional configuration interface, such as the unidirectional configuration interface 108 of FIG. 1. The unidirectional configuration interface indicates the accessory's selectable data connectivity to the attached portable communication device. The accessory further includes a switch, such as the switch 112 of FIG. 1, responsive to the microprocessor. The switch multiplexes data connectivity signals presented by the portable communication device to the first and second GPIO pins to predetermined enable input pins of the microprocessor to enable accessory operation with a selected data connectivity type.

In accordance with some embodiments, an invalid signal configuration is presented by the attached portable communication device to the GPIO1 and GPIO2 pins for a first data connectivity type, and a valid signal configuration is presented by the attached portable communication device to the GPIO1 and GPIO2 pins for a second data connectivity type.

For example, the portable communication device 304 may be a device that supports only UART data connectivity, or the portable radio device may be a device that supports only USB data connectivity; or the portable communication device may be a device that supports both UART and USB data connectivity protocols. For a dual mode radio device that supports both UART and USB data connectivity, the portable radio will have a preferred protocol mode of operation, such as the lower-power UART transport for battery life goals. Upon attachment of the accessory 302 to the portable communication device 304, the accessory 302, incorporating the accessory interface 100 of FIG. 1, provides the selectable UART/USB functionality to the portable communication device via the unidirectional configuration interface (ADS pin). A UART mode of operation will be enabled in response to an invalid USB configuration being presented to the SE1 input of the microprocessor, or a USB mode of operation will be enabled in response to a valid USB configuration being presented to the SE1 input of the microprocessor.

Based on the portable communication device's connectivity type (or preferred connectivity type for a dual mode radio), the first GPIO pin (GPIO1) will be presented with a USB D+ data signal or a UART Tx data signal, and the second GPIO pin (GPIO2) will be presented with a corresponding a USB D− data signal or a UART Rx data signal. The presented signals are multiplexed through the switch 112 for enablement of the microprocessor for the selected mode of operation. Hence, no increase in pin count has been used, regardless data connectivity type.

The accessory 302 provided by the various embodiments is advantageously interchangeably connectible to all three variations of radios. The accessory need not initially recognize which type of radio the accessory is attached to, as the unidirectional configuration interface 108 of FIG. 1 shown as ADS pin in FIG. 3) allows the accessory to shift radio device identification to the radio itself, allowing the radio to present data connectivity type to the GPIO pins (GPIO1, GPIO2). Hence, a user can now attach an accessory 302 to a portable communication device 304 that supports USB data connectivity and properly select and support that USB protocol. That same accessory can also be interchangeably connected to a UART radio device and properly select and support that UART protocol. That same accessory can also be interchangeably connected to a dual protocol radio device and select the radio's preferred protocol mode of operation, such as UART.

Accordingly, there has been provided an improved accessory interface for a portable communication device. The accessory's ability to adapt to different radio data connectivity and/or a combination of radio data connectivity allows for a seamless user experience—where the same accessory can be used with different radios each having a different data connectivity or dual mode data connectivity. The interchangeability is highly beneficial in public safety usage applications where portable radio devices and accessories may be shared amongst different users. Thus a high tier dual mode radio and a lower tier single data connectivity are all able to interchangeably use the same accessory. The embodiments avoid having to use separate product SKUs for different radio products, such SKUs can complicate mixed system deployments and increase SKU count. The interchangeability has been achieved without adding pin count to the accessory connector. The accessory interface is achieved without the use of explicit radio-to accessory communication, thereby avoiding ambiguity and complexity associated with dual direction configuration cues. The accessory interface allows for a small connector form factor with fewer pins, particularly advantageous to wearable accessories for portable communication devices utilized in public safety environments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic accessory having an accessory interface, comprising:
   a microprocessor providing selectable UART and USB (UART/USB) functionality and having a single ended one (SE1) input;
   a connector for connecting the electronic accessory to a portable communication device;
   a configuration memory coupled to the connector via a unidirectional configuration interface, the unidirectional configuration interface indicating the selectable UART/USB functionality to an accessory detection pin of the connector;
   the microprocessor of the accessory being configured to select:
      a UART mode of operation in response to an invalid USB signal configuration being presented to the SE1 input upon attachment of the portable communication device to the electronic accessory; and
      a USB mode of operation in response to a valid USB signal configuration being presented to the SE1 input upon attachment of the portable communication device to the electronic accessory.

2. The electronic accessory of claim 1, further comprising:
   a logic gate coupled to first and second general purpose input/output pins (GPIO1, GPIO2) of the connector, the logic gate receiving voltage inputs upon attachment of the portable communication device to the electronic accessory, the logic gate generating a logic gate output to present to the single ended one (SE1) input of the microprocessor, the microprocessor selecting:
   the UART mode of operation in response to the invalid USB signal being presented to the logic gate and reflected in the SE1 input within a predetermined detection timeframe; and
   the USB mode of operation in response to the valid USB signal configuration being presented to the logic gate and reflected in the SE1 input for the predetermined detection timeframe, and the predetermined detection timeframe expires.

3. The electronic accessory of claim 2, wherein the logic gate is an AND gate.

4. The electronic accessory of claim 1, wherein:
   USB data signals (D+,D−) are presented to first and second general purpose input/output (GPIO1, GPIO 2) pins of the connector when the portable communication device attached to the electronic accessory has USB-only functionality; and
   UART data signals (Tx, Rx) are presented to the GPIO1 and GPIO 2 pins of the connector when the portable communication device attached to the electronic accessory has both USB and UART functionality.

5. The electronic accessory of claim 1, further comprising:
   a switch receiving a selection signal from the microprocessor indicative of the selected mode of operation, the switch multiplexing data signals associated with the selected mode of operation from the portable communication device to corresponding enablement input pins of the microprocessor.

6. The electronic accessory of claim 5, wherein for UART mode of operation, the switch is multiplexed to apply Tx, Rx data signals from the portable communication device to UART inputs of the microprocessor.

7. The electronic accessory of claim 6, wherein for USB mode of operation the switch is multiplexed to apply $D^+$, $D^-$, data signals from the portable communication device to USB configuration input ports of the microprocessor.

8. The electronic accessory of claim 7, wherein the unidirectional configuration interface provides a one-way interface from the configuration memory to the connector and does not provide an interface from the connector to the configuration memory.

9. The electronic accessory of claim 1, wherein the connector is a Global Core Accessory Interface (GCAI) connector.

10. The electronic accessory of claim 1, wherein the accessory interface is incorporated into a remote speaker microphone (RSM) accessory, and the portable communication device is a battery operated portable two-way radio.

11. A method for interfacing an electronic accessory to a portable radio, comprising:
  detecting that the accessory is attached to the portable radio and turned on;
  synchronizing that portable radio to the accessory;
  providing an indicator to the portable radio from a memory of the accessory via a unidirectional configuration interface that the accessory provides selectable UART/USB functionality;
  reading a status input of a single ended one (SE1) input port of a microprocessor of the accessory and determining one of:
    an invalid USB logic configuration; and
    a valid USB logic configuration;
  selecting a UART mode of operation when an invalid USB logic configuration is presented to the SE1 input of the accessory microprocessor; and
  selecting a USB mode of operation when a valid USB logic configuration is presented to the SE1 input of the accessory microprocessor.

12. The method of claim 11, further comprising:
  multiplexing a switch of the accessory to apply UART data signals (Tx, Rx) to UART input pins of the microprocessor to enable UART operation when the UART mode of operation is selected; and
  multiplexing the switch of the accessory to apply USB data signals (D+, D−) to USB input pins of the microprocessor to enable the USB operation when the USB mode of operation is selected.

13. The method of claim 11, further comprising:
  selecting a UART mode of operation when the invalid USB logic configuration is presented to the SE1 input of the accessory microprocessor within a predetermined detection timeframe; and
  selecting the USB mode of operation when the valid USB logic configuration is presented to the SE1 input of the accessory microprocessor during the predetermined detection timeframe and the predetermined detection timeframe expires.

14. The method of claim 11, wherein the accessory is a remote speaker microphone (RSM) and the portable radio is a battery operated portable two-way radio, and the connector is a cabled, global communications accessory interface (GCAI) connector.

15. A communication system, comprising:
  a plurality of portable communication devices having different data connectivity types;
  an electronic accessory, comprising:
    a connector providing interchangeable attachment of the accessory to each of the plurality of portable communication devices, the connector having an accessory detect pin, a first general purpose input output (GPIO1) pin, and a second general purpose input output (GPIO2) pin;
    a configuration memory indicating selectable data functionality, the configuration memory being operatively coupled to the accessory detect pin of the connector via a unidirectional configuration interface, the unidirectional configuration interface indicating the selectable data functionality to an attached portable communication device of the plurality of portable communication devices;
    a microprocessor that supports the selectable data functionality via a single ended one (SE1) input, wherein:
      an invalid signal configuration is presented by the attached portable communication device to the GPIO1 and GPIO2 pins for a first data connectivity type; and
      a valid signal configuration is presented by the attached portable communication device to the GPIO1 and GPIO2 pins for a second data connectivity type; and
    a switch responsive to the microprocessor, the switch multiplexing data connectivity signals presented by the portable communication device to the first and second GPIO pins to corresponding input pins of the microprocessor to enable accessory operation with a selected data connectivity type.

16. The communication system of claim 15, wherein the plurality of portable communication devices include at least one dual mode radio having more than one data connectivity type, wherein the dual mode radio presents a preferred data connectivity type to the first and second GPIO pins of the accessory.

17. The communication system of claim 15, where the electronic accessory further comprises:
  a logic gate coupled to the single ended one (SE1) input of the microprocessor indicating the presence of a single ended one (SE1) state on the first and second GPIO pins to select the data connectivity type that was presented to the electronic accessory.

18. The communication system of claim 15, wherein the SE1 input of the microprocessor is used regardless of data connectivity type.

19. The communication system of claim 15, wherein:
  the invalid signal configuration is an invalid USB signal configuration, and the first data connectivity type is a UART connectivity type; and
  the valid signal configuration is a valid USB signal configuration, and the second data connectivity type is a USB data connectivity type.

20. The communication system of claim 15, wherein the selectable data functionality of the accessory:
  supports UART data connectivity for a UART-only portable communication device;
  supports USB data connectivity for a USB-only portable communication device; and
  supports UART data connectivity for a dual mode (USB/UART) portable communication device.

21. The communication system of claim 15, wherein the accessory is a remote speaker microphone (RSM) and the portable communication device is a battery operated portable radio, and the connector is cabled global communications accessory interface (GCAI) connector.

* * * * *